United States Patent [19]

Jacobs

[11] Patent Number: 4,609,961
[45] Date of Patent: Sep. 2, 1986

[54] FARADAY-EFFECT MAGNETO-OPTIC TRANSDUCER

[75] Inventor: John H. Jacobs, Altadena, Calif.

[73] Assignee: Datatape Incorporated, Pasadena, Calif.

[21] Appl. No.: 642,225

[22] Filed: Aug. 20, 1984

[51] Int. Cl.[4] ................. G11B 5/127; G11B 11/10
[52] U.S. Cl. ........................... 360/114; 369/110
[58] Field of Search .............. 360/114; 369/13, 100, 369/110; 350/375–377, 384

[56] References Cited

U.S. PATENT DOCUMENTS 3,465,322 9/1969 Stapper, Jr. ..................... 360/114
3,665,431 5/1972 Alstad et al. ..................... 360/114

FOREIGN PATENT DOCUMENTS 52-60111 5/1977 Japan ..................... 360/114
59-16158 1/1984 Japan ..................... 369/13

Primary Examiner—John H. Wolff
Assistant Examiner—Matthew J. Bussan
Attorney, Agent, or Firm—Dennis P. Monteith

[57] ABSTRACT

A Faraday-effect magneto-optic transducer provides for optimizing the transmission of light through the transducer. A transparent supporting assembly for a planar element of magneto-optic material includes first and second reflectors on opposing sides of the element. The reflectors direct polarized light through the element substantially normal to its interface with the supporting assembly, for preventing light loss due to internal reflections as light is transmitted through the supporting assembly and magneto-optic element.

3 Claims, 3 Drawing Figures

FARADAY-EFFECT MAGNETO-OPTIC TRANSDUCER

BACKGROUND OF THE INVENTION

1. Field Of The Invention

The invention relates to a transducer for reading information magnetically recorded on a magnetic storage medium. More particularly, the invention relates to a Faraday-effect magneto-optic transducer for providing an optical indication of magnetic states of the storage medium.

2. Description of the Prior Art

Magneto-optic transducers are known in the prior art for providing an optical indication of information recorded on a magnetic storage medium. A magneto-optic material is magnetized corresponding to magnetic fields produced by magnetization in an adjacent storage medium. A beam of polarized light irradiates the magneto-optic material which causes plus or minus rotation of the plane of polarization of the light depending upon the strength and direction of magnetization of the material. A light-responsive device detects these light variations, for providing an indication of the information recorded on the storage medium. The so-called Faraday effect occurs when light is transmitted through, rather than reflected from, a film of magnetized magneto-optic material.

U.S. Pat. No. 3,665,431 discloses a Faraday-effect transducer in which a magneto-optic film supported by a glass substrate, is positioned at an angle other than parallel with respect to an information-bearing surface of a magnetic tape. Because magnetization in a magnetic storage medium, such as magnetic tape, only induces magnetism in magneto-optic material a short distance from the storage medium, an edge of the magneto-optic film is in an essentially contacting relationship with the tape. To obtain high resolution and sufficient magneto-optic interaction, a polarized beam of light is focused on a minute portion of the periphery of the film adjacent the tape as the light is transmitted through the transducer.

In the transducer of U.S. Pat. No. 3,665,431, the light is transmitted through the glass substrate along an optical path which is oblique to the magneto-optic film. Polarized light is reflected at the interface between the film and supporting substrate as light enters and exits the magneto-optic film, thereby contributing to light loss as light is transmitted through the transducer. Additionally, because the refractive index of the glass substrate is different than the refractive index of the film, the light passing through the film is refracted both as it enters and exits the film. This refraction makes it more difficult to accurately align light-sensitive devices used to detect and analyze light transmitted through the transducer, as the angle at which light exits the transducer varies according to the thickness of the magneto-optic film and the angle of incidence of light impinging on the film.

SUMMARY OF THE INVENTION

In view of the foregoing, an object of the invention is to provide a Faraday-effect magneto-optic transducer that optimizes the transmission of a concentrated beam of polarized light through the transducer during a magneto-optic operation. This object is achieved by directing the light along a composite optical path so that the light enters and exits substantially normal to the transducer, and so that the light is also transmitted substantially normal to an interface between a planar magneto-optic material and a transparent supporting substrate.

Because light transmitted through the magneto-optic material must pass very close to an underlying magnetic storage medium, it is not practical to project light as disclosed above through the transducer directly between the light source and a receiving light detector. Accordingly, the supporting substrate for the magneto-optic material includes a reflector assembly having first and second reflectors arranged, respectively, on opposing sides of the magneto-optic material. The light source is arranged to cause light to enter the transducer substantially normal to the surface of the supporting substrate, thereby reducing light loss due to reflection as light enters the transducer. The first reflector is arranged for directing light propagating through the supporting substrate along an optical path substantially normal to the interface between the supporting substrate and the magneto-optic material, to limit both reflection and refraction of light passing from the supporting substrate into the magneto-optic material, and reflection and refraction of light passing from the material thereby reducing light loss due to internal reflections as light is transmitted through the transducer. The second reflector is arranged for directing light that passes through the magneto-optic material, along a path that is substantially normal to the surface of the supporting substrate where the light exits the transducer, so as to reduce light loss from reflection as light exits the transducer.

With this arrangement, very little light is reflected back along or away from the optical path as light propagates from the magneto-optic material to its supporting substrate or vice versa, and as light enters and exits the transducer. Thus, little light is lost through reflections internal to the transducer, which is not the case with the transducer of U.S. Pat. No. 3,665,431. Furthermore, although the refractive indices of the magneto-optic material and supporting substrate are not equal, refraction is effectively eliminated. Thus, the angle at which light exits from the transducer is precisely controlled which facilitates the accurate positioning of a light detector for analyzing the transmitted light.

The invention and its other advantages will become more apparent in the detailed description of preferred embodiments presented below.

DESCRIPTION OF THE DRAWING

In a detailed description of preferred embodiments of the invention presented below, reference is made to the accompanying drawing, in which.

DETAILED DESCRIPTION OF PREFERRED EMBODIMENTS

Because magneto-optic transducers are well known, the present description will be directed in particular to elements forming part of, or cooperating directly with, apparatus in accordance with the present invention. It is to be understood that elements not specifically shown or described may take various forms well known to those having skill in the art.

The illustrated preferred embodiments of the invention include magneto-optic apparatus for reading information from a magnetic record medium 10 having magnetic fields 12 extending from a surface 13 of the record medium and through a region 14 external to the medium 10. The medium 10 may be a magnetic tape, disk, drum or the like.

Figure 1:
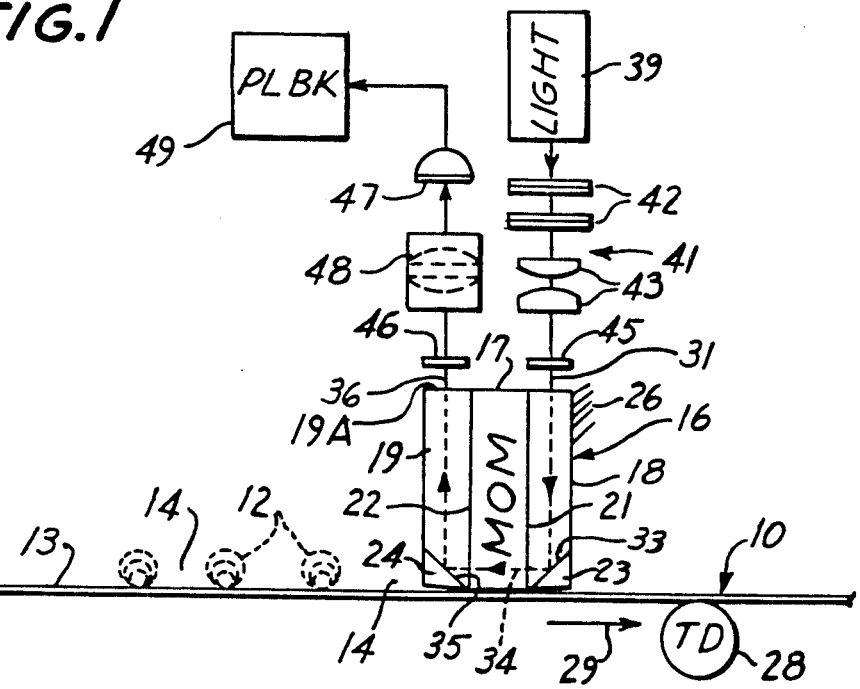
FIG. 1 is a side elevation view of a magnetic storage medium and a magneto-optic reading device, according to an embodiment of the invention, with an associated illumination and light analysis system.

A magneto-optic transducer 16 shown in FIG. 1, or a magneto-optic transducer shown in FIG. 2 and more fully described below, is produced by securing a planar element 17 of magneto-optic material (MOM) to a transparent supporting assembly comprising a pair of transparent supporting members 18 and 19 contacting opposing surfaces 21 and 22 of the element 17, respectively. The width of the element 17 is very narrow, particularly relative to the members 18 and 19, and may be on the order of a few hundred Angstrom units. The element 17 of FIG. 1 is not drawn to scale, so as to more clearly illustrate the transducer 16.

As is known in the art, magneto-optic material, such as element 17, has a light transmission property that varies according to magnetism stored in the material. When polarized light is transmitted through a magneto-optic material, the plane of polarization of the light is rotated either in a plus or minus direction as a function of the strength and direction of the magnetization of the material. The magneto-optic material used in or for the element 17 may, for instance, be yttrium iron garnet. Other useful magneto-optic materials are disclosed in U.S. Pat. Nos. 3,465,322 and 3,626,394, and the aforementioned U.S. Pat. No. 3,665,431.

The supporting assembly of the transducer 16 is mounted so that the plane of the element 17 is nonparallel with respect to the medium 10. In a preferred embodiment of FIG. 1, the element 17 is substantially normal to the surface 13 of medium 10. The lower edge of the element 17 is positioned immediately adjacent the surface 13 of the medium 10 so that magnetic fields 12 in the region 14 can penetrate the lower periphery of the element 17 when the respective fields are aligned with the plane of the element 17. The means for so mounting the transducer 16 may be of a conventional playback head mounting type and, accordingly, is only shown diagrammatically at 26.

The transparent members 18 and 19 may be made from an optical glass and, therefore, have an index of refraction that is different from the refractive index of the element 17. A material harder than glass could be employed, such as optically clear synthetic sapphire or aluminum oxide. The tips of the transparent members 18 and 19 may be protected respectively by deposits or wedges 23 and 24 of a frit or other hard material for resisting wear at the pass of the medium 10.

A magnetic tape drive 28, which may also be of a conventional type, is employed in the illustrated embodiments for effecting movement of the medium 10 in the direction of the arrow 29.

In accordance with the invention, light is transmitted through the transducer 16 in a way that limits refraction and limits the amount of light that is lost through reflections as light is transmitted through the transducer 16. For that purpose, light is directed through the transducer 16 along a composite optical path portions of which are substantially normal to the transducer as light enters and exits the transducer, respectively, and another portion of which is substantially normal to the interface between the magneto-optic element 17 and its transparent supporting assembly.

The supporting assembly includes a reflector assembly comprising first and second reflectors 33, 35 on opposing sides, respectively, of the element 17. The reflector 33 is arranged with respect to the supporting member 18 for reflecting light incident to the transducer 16 and propagating through the member 18, along a light path 34 that is substantially normal to the interface between the member 18 and the element 17, adjacent the storage medium 10. The reflector 35 is arranged with respect to the supporting member 19 for reflecting light that passes through the element 17, along a light path that is substantially normal to the supporting member 19 where the light exits the transducer 16.

In the operation of the transducer 16, a laser or other source 39 of concentrated light may be provided as a light source. A lens system 41 may be employed for collecting and directing light, denoted 31. For example, the lens system 41 may include cylindrical lenses 42 and 43 and a polarizer 45 for providing a concentrated beam of polarized light for traversing the magneto-optical element 17. The projected beam of light 31 may be relatively wide, for example, when multiple information tracks are recorded on the medium 10. In multiple track applications, the transducer 16 may be structured as a multi-core head, subdivided in several parallel magneto-optic sections corresponding to respective tracks of recorded information.

Polarized light 31 incident to the transducer 16 is directed by the lens system 41 substantially normal to the surface of the member 18, as shown. Thus, almost all the incident light enters the supporting assembly as little light is reflected back from the surface of the member 18. The reflector 33, which is positioned in the path of the light 31, directs light within the member 18 along the aforementioned light path 34, through the element 17, and into the other of the transparent members 19. Thus, little or no reflection of light occurs as it propagates from the member 18 into element 17, and from the latter into element 19. Although the index of refraction of the respective members 18 and 19 is different from the refractive index of the element 17, refraction of light is essentially eliminated as light passes from one medium to another.

A magneto-optic transducer, unlike a conventional wire-wound magnetic head, responds to magnetism on the medium 10 without any need for relative motion between the medium and transducer. The drive 28 moves the medium 10, in the direction of the arrow 29, so that the element 17 is exposed to magnetism at any point on the medium 10. The polarization of the light 31 is modified according to the magnetization induced in the element 17 in response to the magnetic fields 12. The reflector 35, in turn, reflects the polarized light modified by the element 17 along a light path, denoted 36, substantially normal to the surface 19A of the member 19, for exiting from the transducer 16.

An analyzer 46 is positioned along the light path external of the tranducer 16. An optical sensor or detector 47 may be employed for sensing or detecting changes in polarization of the light 36 effected by the magneto-optic element 17 in response to magnetic fields 12 from the medium 10. A lens or lens system 48 is employed for projecting the analyzed light onto the sensor 47. In the aforementioned multiple-track applications, the sensor 47 may include multiple sensors, each of which corresponds to a particular track of recorded information. The output signal of the sensor 47, which may, for example, be a photocell, is applied to electronic playback equipment 49 including, for example, a playback amplifier and means for displaying or processing the played-back information in a conventional manner.

Either of the transparent members 18 and 19 may be a substrate of or for the element 17 of magneto-optic material. For instance, if the element 17 is provided on a transparent substrate 18, then it may be sandwiched between that substrate and a transparent member 19. Conversely, if the element 17 is provided on a transparent substrate 19, then such element is sandwiched between the substrate 19 and the transparent member 18.

A slab of material convertible into alternating magneto-optic active and transparent inactive strata may be provided at transducer 16 according to a further preferred embodiment of the subject invention. By way of example, conventional doping techniques may be employed for providing in such a slab a magneto-optic active element 17 sandwiched between a pair of transparent inactive strata 18 and 19 of such slab. The transducer 16 may thus, for instance, be grown from garnet, with a doped layer of element 17 therein serving as the magneto-optic material.

Of course, the outer strata 18 and 19 are not inactive in every respect but may, for instance, conduct light to and from the magneto-optically active central element 17. However, it is the central element 17 that is magneto-optically active, wherefore the outer strata or layers 18 and 19 are herein referred to as "inactive," relative to the magneto-optic central stratum of element 17. In this respect, the magneto-optically active element 17 may be grown by doping from the same material as either one or both of the magneto-optically inactive strata 18 and 19. If the element 17 is grown together with only one of the outer strata 18 or 19, then the other layer 19 or 18 may be provided by sandwiching the magneto-optically active element 17 between the integral inactive stratum 18 or 19 and a transparent member 19 or 18.

Figure 2:
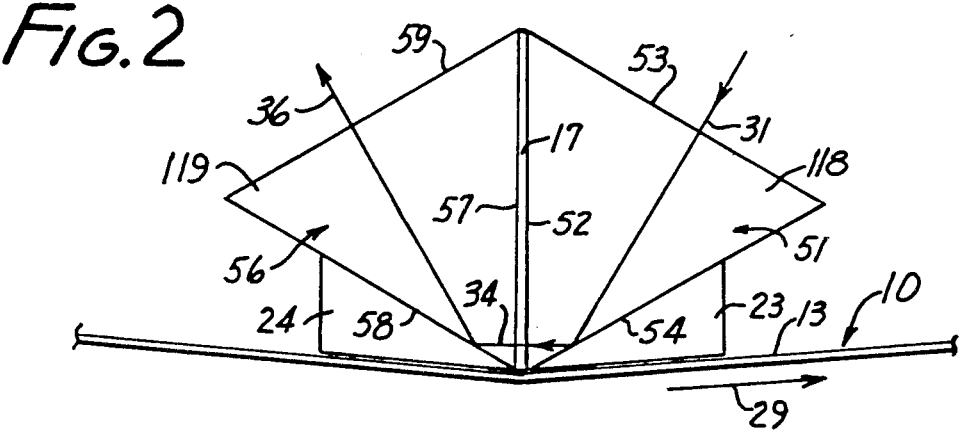
FIG. 2 is a side elevation view of an alternate preferred embodiment of a magneto-optic reading device according to the invention.

In the embodiment of the invention shown in FIG. 2, a transparent member is provided in the form of a first prism 51 having a planar face 52 in contact with the element 17, a face 53 arranged for receiving the polarized light 31 at a right angle thereto for entry into the prism 51, and a face 54 situated at an angle with respect to both the plane of the element 17 and the surface 13 of the storage medium 10. The face 54 has a reflector surface for reflecting polarized light 31, passing through the prism 51, substantially normal to the element 17, as shown at 34.

A second transparent member is provided in the form of a second prism 56 having a planar face 57 contacting the element 17, a face 58 having a reflecting surface for reflecting modified polarized light 36 that passes through the element 17, and a face 59, for exiting light from the prism 56 substantially normal to the face 59.

The respective cross-sections of the first prism 51, and the second prism 56, as shown in FIG. 2, form equilateral triangles. In practice, isosceles triangles are, however, sufficient for the normal or right-angle entry and exit, respectively, of the light beams 31 and 36 and the normal or right-angular traverse of the light beam 34 through the element 17.

The embodiments of the invention shown in FIGS. 1 and 2 have several features in common. For instance, the magneto-optic element 17 is sandwiched between and in intimate contact with both of the first and second transparent members 18 and 19 or prism 51 and 56 in both embodiments. Also, the projected polarized light 31 is reflected through the element 17 at right angles thereto, as seen at 34 in FIGS. 1 and 2, and in close proximity to the storage medium 10.

Also, in the embodiments of FIGS. 1 and 2, the transparent member 18 or 51 is provided with a reflective surface 33 or 54 situated at an angle with respect to the plane of the element 17 and the surface 13 of the information carrier 10, for reflection of the projected polarized light 31 through the element 17 at right angles thereto, as shown at 34 in FIGS. 1 and 2. In practice, these features, according to the preferred embodiments of the invention, avoid the disadvantageous reflections in the aforementioned U.S. Pat. No. 3,665,431. Furthermore, these features prevent refraction of the polarized light as it passes from the transparent supporting assembly into the element 17, and vice versa, thereby enabling a more accurate control of the angle at which light exits from the transducer 16.

In both embodiments, wedges 23 and 24 of frit or another material harder than the transparent members 18 and 19 or 51 and 56 may be provided at the reflectors 33 and 35 or 54 and 58 thereof adjacent the surface 13 of the information carrier 10. In this manner, the tips of the members 18 and 19 or 51 and 56 are at the same time protected against wear from the medium 10.

In the embodiment of FIG. 1, light exiting the transducer 16 is parallel to the incoming light even if the transducer becomes tilted with respect to the light source 39, or vice versa. If the detector 47 is attached to the light source 39, the entire assembly remains aligned, independent of such tilts. For magnetic tape apparatus, the light source 39 and the detector 47 would normally be attached to the magneto-optic transducer 16, so that tilting of one portion of the assembly relative to another portion would not occur. However, when the storage medium 10 is a magnetic disk, the transducer 16 may move at high speed, e.g. "fly" over the disk. In this case, the optics of the assembly may not be attached to the transducer 16.

Figure 3:
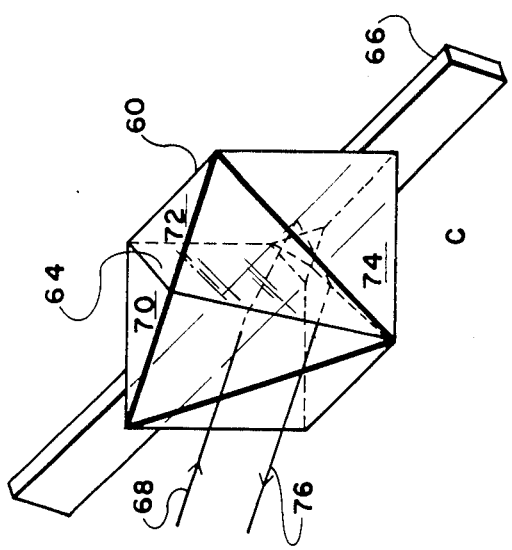
FIGS. 3a, b, c illustrate a method of fabricating a corner cube reflector for use in the embodiment of FIG. 1.
Figure 3:
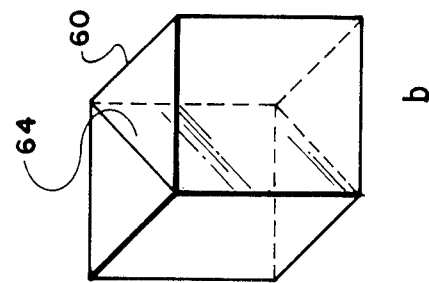
Figure 3:
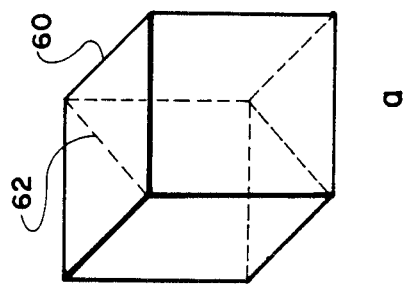

A so-called corner cube reflector has the property that light is returned parallel to incoming light, independent of the orientation angle of the cube. A method of fabricating a corner cube reflector for use in the invention is illustrated in FIG. 3. A cube 60 is cut in half along a diagonal 62 (FIG. 3a) intersecting opposite corners of the cube. Diagonal faces of the cube 60 are polished. A thin film of magneto-optic material 64 is deposited on the diagonals, which are then cemented together to again form a cube, as shown in FIG. 3b.

The cube 60 is truncated by polishing one pair of diagonally opposing corners in the plane of the magneto-optic material 64 such that the truncated corners are parallel to each other. As viewed in FIG. 3c, the forwardly facing portion of the cube, which is arranged to receive incoming light, is truncated to a greater extent than the rearwardly facing portion of the cube, which is adjacent the information-bearing surface of a magnetic tape 66. Incoming light 68 reflects off the back face 70 of the cube 60 and is projected through the magneto-optic material 64, to modulate the light according to the magnetism of the material 64. The modulated light reflects off the back face 72, then reflects off the bottom face 74 wherein the reflected light 76 exits the cube 60 parallel to the incoming light.

The invention has been described in detail with particular reference to preferred embodiments thereof, but it will be understood that variations and modifications can be effected within the spirit and scope of the invention.

What is claimed is:

1. In a magneto-optic transducer apparatus for use with a magnetic storage device having an information-bearing surface producing magnetic fields, said transducer apparatus including a planar element having a light transmission property that is functionally related to an applied magnetic field, and means for projecting an incoming beam of polarized light onto said magneto-optic transducer apparatus, the improvement comprising:

(a) a first substantially transparent prism arranged adjacent a surface of said planar element in the path of the incoming polarized light beam, and a second substantially transparent prism adjacent the opposing surface of said planar element, each of said prisms having a first major surface respectively contacting the opposing surfaces of said planar element to form a unitary structure supporting said planar element in a position substantially orthogonal to and immediately adjacent the information-bearing surface of such a magnetic storage device, to cause the light transmission property of said element to vary under the influence of a magnetic field emnating from such magnetic storage device; and (b) a first light reflector and a second light reflector integral with corresponding second major surfaces of said first prism and said second prism, respectively, said first reflector and said second reflector being arranged in the path of the polarized light beam on opposing sides of said planar element for directing the light beam along a unidirectional optical path through both said prisms and said planar element, the optical path being (1) in intersecting relationship with the periphery of said planar element to be positioned immediately adjacent such magnetic storage device, to enhance the influence of the magnetic field applied to said planar element, and (2) substantially normal to the interface between said first prism and said planar element and the interface between said second prism and said planar element, to limit light loss due to reflection of light passing initially through said first prism of said unitary structure and into said planar element and subsequently passing through said planar element and entering said second prism of said unitary structure on the opposite side of said element, as polarized light is transmitted unidirectionally through said magneto-optic transducer apparatus.

2. A magneto-optic transducer apparatus as claimed in claim 1 wherein said first and second reflectors are arranged so that the polarized light beam can enter and exit said transducer apparatus substantially parallel to the plane of said planar element.

3. A magneto-optic transducer apparatus as claimed in claim 1 wherein said first reflector and said second reflector are arranged so that the polarized light beam can enter and exit said transducer apparatus oblique to the plane of said planar element.

* * * * *